United States Patent
Muto (10) Patent No.: US 10,097,758 B2
(45) Date of Patent: Oct. 9, 2018

(54) DATA PROCESSING APPARATUS, DATA PROCESSING METHOD, AND RECORDING MEDIUM

(71) Applicant: CASIO COMPUTER CO., LTD., Tokyo (JP)

(72) Inventor: Tasuku Muto, Musashino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/268,999

(22) Filed: Sep. 19, 2016

(65) Prior Publication Data

US 2017/0142336 A1 May 18, 2017

(30) Foreign Application Priority Data

Nov. 18, 2015 (JP) ................................ 2015-226104
Sep. 8, 2016 (JP) ................................ 2016-175620

(51) Int. Cl.
H04N 5/232 (2006.01)

(52) U.S. Cl.
CPC ..... *H04N 5/23261* (2013.01); *H04N 5/23212* (2013.01); *H04N 5/23258* (2013.01); *H04N 5/23267* (2013.01)

(58) Field of Classification Search
CPC ........... H04N 5/23212; H04N 5/23258; H04N 5/23267; H04N 5/23251
USPC ..................................................... 348/208.2
See application file for complete search history.

(56) References Cited

U.S. PATENT DOCUMENTS

| 5,740,471 | A | * | 4/1998 | Terui | G02B 27/646 |
|---|---|---|---|---|---|
| | | | | | 348/E5.046 |
| 8,675,082 | B2 | * | 3/2014 | Sato | H04N 1/00127 |
| | | | | | 348/208.99 |
| 9,124,803 | B2 | * | 9/2015 | Kitamura | H04N 5/23245 |
| 9,154,727 | B2 | * | 10/2015 | Sato | H04N 1/00127 |
| 9,843,729 | B2 | * | 12/2017 | Nichols | H04N 5/23267 |
| 2011/0063118 | A1 | * | 3/2011 | Sato | H04N 1/00127 |
| | | | | | 340/635 |
| 2013/0010137 | A1 | * | 1/2013 | Kawai | H04N 5/23258 |
| | | | | | 348/208.1 |

(Continued)

FOREIGN PATENT DOCUMENTS

JP 2009-267792 A 11/2009

*Primary Examiner* — Pritham Prabhakher
(74) *Attorney, Agent, or Firm* — Fitch, Even, Tabin & Flannery LLP (57) ABSTRACT

When it is determined that acceleration acting on an imaging apparatus is stable and an attitude direction determination result based on the acceleration continues as the same result, an attitude determination unit updates the attitude direction determination result to the latest one to be used for blur correction of a frame upon playback. On the other hand, when the acceleration acting on the imaging apparatus is not stable, when the attitude direction determination result based on the acceleration is different from the last result, or when attitude direction determination result does not continue predetermined times though it is the same result as the last determination result, the attitude determination unit does not update the attitude direction determination result to hold the past attitude direction determination result and use it for blur correction and the like of the frame upon playback.

15 Claims, 5 Drawing Sheets

(56) References Cited

U.S. PATENT DOCUMENTS

| | | | |
|---|---|---|---|
| 2014/0133548 A1* | 5/2014 | Mate | H04N 9/8205 375/240.02 |
| 2014/0146203 A1* | 5/2014 | Sato | H04N 1/00127 348/231.99 |
| 2015/0103189 A1* | 4/2015 | Karpenko | H04N 5/23264 348/208.2 |
| 2015/0181123 A1* | 6/2015 | Pacurariu | H04N 5/3454 348/208.2 |
| 2015/0249793 A1* | 9/2015 | Nichols | C07D 409/12 348/239 |
| 2016/0127649 A1* | 5/2016 | Tsuchiya | G03B 5/00 348/208.11 |
| 2016/0156848 A1* | 6/2016 | Jen | H04N 5/23258 348/208.2 |

* cited by examiner

DATA PROCESSING APPARATUS, DATA PROCESSING METHOD, AND RECORDING MEDIUM

CROSS-REFERENCE TO RELATED APPLICATIONS

This application is based upon and claims the benefit of priority from the prior Japanese Patent Application No. 2015-226104, filed Nov. 18, 2015, and the prior Japanese Patent Application No. 2016-175620, filed Sep. 8, 2016, the entire contents of which are incorporated herein by reference.

BACKGROUND OF THE INVENTION

1. Field of the Invention

The present invention relates to a data processing apparatus, a data processing method, and a recording medium.

2. Description of the Related Art

As disclosed in Japanese Patent Application Laid-Open No. 2009-267792, there is proposed an imaging apparatus worn around a user's head to capture an image ahead of a user's line of sight. In such an imaging apparatus, it is not assumed that imaging is performed with a stable attitude. Therefore, it is considered to perform imaging automatically at timing when the attitude becomes stable.

SUMMARY OF THE INVENTION

A data processing apparatus according to the present invention includes:

an attitude information acquisition unit that acquires each piece of information related to the attitude of a data acquisition apparatus at the time of acquiring a data; and a control unit that performs control to adopt information, acquired at a time other than the time of acquiring the data, as information related to an attitude at the time of acquiring the information depending on the content of the information related to the attitude acquired by the attitude information acquisition unit.

Further, a data processing method according to the present invention includes:

an attitude information acquisition step of acquiring each piece of information related to the attitude of a data acquisition apparatus at the time of acquiring a data; and a control step of performing control to adopt information, acquired at a time other than the time of acquiring the data, as information related to an attitude at the time of acquiring the data depending on the content of the information related to the attitude acquired in the attitude information acquisition step.

Further, a recording medium according to the present invention is a computer-readable recording medium recording a program that causes a computer to function as:

an attitude information acquisition unit that acquires each piece of information related to the attitude of a data acquisition apparatus at the time of acquiring a data; and a control unit that performs control to adopt information, acquired at a time other than the time of acquiring the data, as information related to an attitude at the time of acquiring the data depending on the content of the information related to the attitude acquired by the attitude information acquisition unit.

DETAILED DESCRIPTION OF THE PREFERRED EMBODIMENTS

First Embodiment

Figure 1:
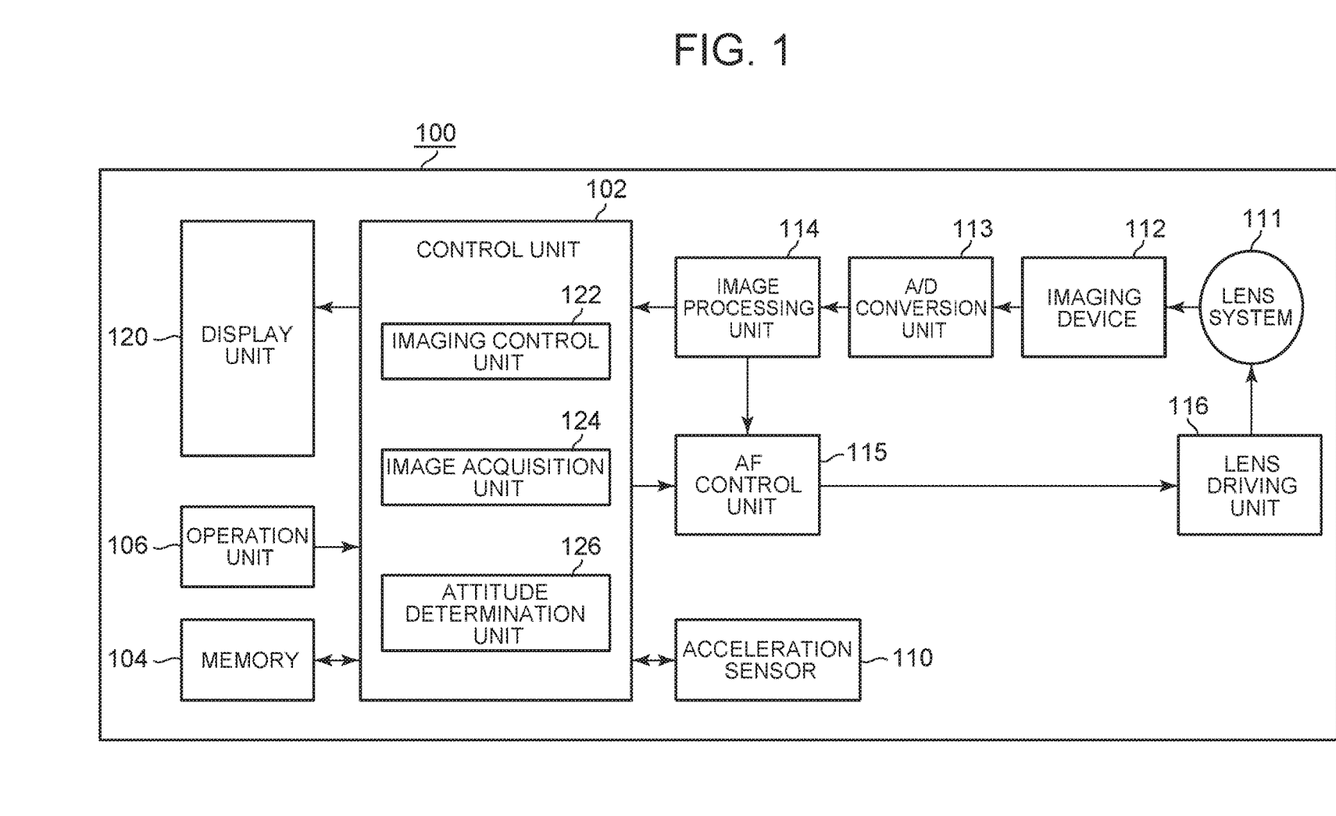
FIG. 1 is a block diagram illustrating the configuration of an imaging apparatus according to a first embodiment of the present invention.

An imaging apparatus as a data processing apparatus according to an embodiment of the present invention will be described below. As illustrated in FIG. 1, an imaging apparatus 100 according to the embodiment of the present invention is configured to include a control unit 102, a memory 104, an operation unit 106, an acceleration sensor 110, a lens system 111, an imaging device 112, an analog/digital (A/D) conversion unit 113, an image processing unit 114, an autofocus (AF) control unit 115, a lens driving unit 116, and a display unit 120. For example, the imaging apparatus 100 is worn around a user's head to image the front side of the user.

The control unit 102 includes a CPU (Central Processing Unit) to perform software processing according to a program stored in the memory 104 in order to implement an imaging control unit 122, an image acquisition unit 124, an attitude determination unit 126, and the like, as functions provided in the imaging apparatus 100.

The imaging control unit 122 in the control unit 102 controls imaging according to user's operations to the operation unit 106 to instruct the AF control unit 115 on imaging control such as focus control and zoom control. The image acquisition unit 124 acquires frames as image data input from the image processing unit 114. The attitude determination unit 126 determines a direction at the imaging time of the imaging apparatus 100 based on the acceleration of the imaging apparatus 100 from the acceleration sensor 110. Imaging-time processing performed by the control unit 102 will be described later.

The memory 104 is composed of a non-volatile memory and a volatile memory. The non-volatile memory stores various pieces of information (a program and the like) used for control in the imaging apparatus 100 and the like, attitude direction determination results at imaging timing to be described later, and the like. The volatile memory is used, for example, as a work area.

The operation unit 106 is an interface used to input a user's operation content. For example, the operation unit 106 includes keys operated by the user.

The acceleration sensor 110 sequentially detects acceleration caused along with the movement of the imaging apparatus 100. For example, the acceleration sensor 110 detects acceleration in each of the X-axis, Y-axis, and Z-axis directions in a three-dimensional space. The acceleration sensor 110 outputs detected acceleration data to the control unit 102. The acceleration data are stored in the memory 104.

The X-axis direction in this three-dimensional space indicates the horizontal direction (or the right and left direction) perpendicular to an optical axis direction of the lens system 111 in the imaging apparatus 100. The Y-axis direction indicates the vertical direction (or the up and down direction) perpendicular to the optical axis direction of the lens system 111 in the imaging apparatus 100. The Z-axis direction indicates the optical axis direction (or the front and rear direction) of the lens system 111 in the imaging apparatus 100.

The AF control unit 115 controls the lens driving unit 116 according to an imaging control instruction such as focus control or zoom control from the imaging control unit 122 or the image processing unit 114 in the control unit 102. The lens driving unit 116 has a built-in motor to move the lens system 111. In response to the control by the AF control unit 115, the lens driving unit 116 moves the lens system 111 to perform focus control or zoom control.

The lens system 111 is composed of a zoom lens and the like. The lens system 111 is moved under the control of the lens driving unit 116. An angle of view upon imaging and an optical image are controlled by the movement of the lens system 111.

The imaging device 112 is composed of multiple light-receiving elements and sample-hold circuits, two-dimensionally arranged on a light-receiving surface in a regular way, and the like. Each light-receiving element is, for example, an imaging element such as a photodiode, a Bayer arrangement color filter, a CCD (Charge Coupled Device) element, or a CMOS (Complementary Metal Oxide Semiconductor) element. The imaging device 112 captures an optical image (receives light) entering through the lens system 111, and outputs an analog image signal to the A/D conversion unit 113.

The A/D conversion unit 113 converts the analog image signal from the imaging device 112 into digital data, and outputs the digital data.

The image processing unit 114 is configured to include a color process circuit, a JPEG (Joint Photographic Experts Group) circuit, a digital video encoder, and the like. The image processing unit 114 receives input of the digital data from the A/D conversion unit 113 to generate a frame as image data. The image processing unit 114 outputs the generated frame to the image acquisition unit 124 in the control unit 102. Further, the image processing unit 114 analyzes the generated frame to determine whether focus control is required, and when it is required, instructs the AF control unit 115 to perform focus control.

The display unit 120 is, for example, an LCD (Liquid Crystal Display), a PDP (Plasma Display Panel), an EL (Electro-Luminescence) display, or the like to display an image corresponding to the frame.

Figure 2:
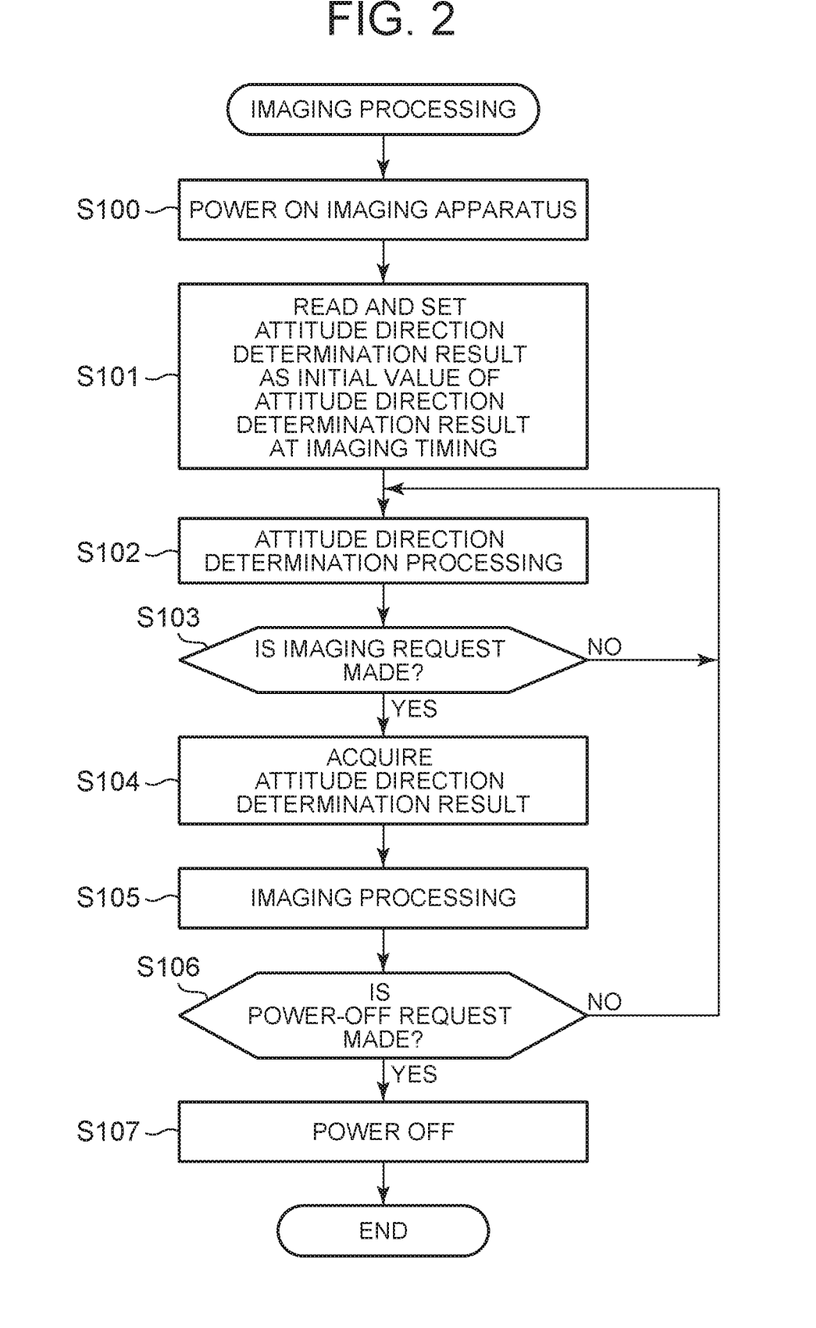
FIG. 2 is a flowchart illustrating the operation of imaging processing in the imaging apparatus according to the embodiment.

Next, imaging processing by the imaging apparatus 100 will be described in detail. FIG. 2 is a flowchart illustrating the operation of imaging processing.

When the imaging apparatus 100 is powered on to start up (step S100), the attitude determination unit 126 in the control unit 102 reads and sets an attitude direction determination result prestored in the non-volatile memory inside the memory 104 as an initial value of the attitude direction determination result at imaging timing (step S101). Here, the attitude direction determination result stored in the memory 104 is the latest attitude direction decided to be held among the attitude directions of the imaging apparatus 100 determined in attitude direction determination processing (processing in step S102 to be described below) in the past.

Figure 3:
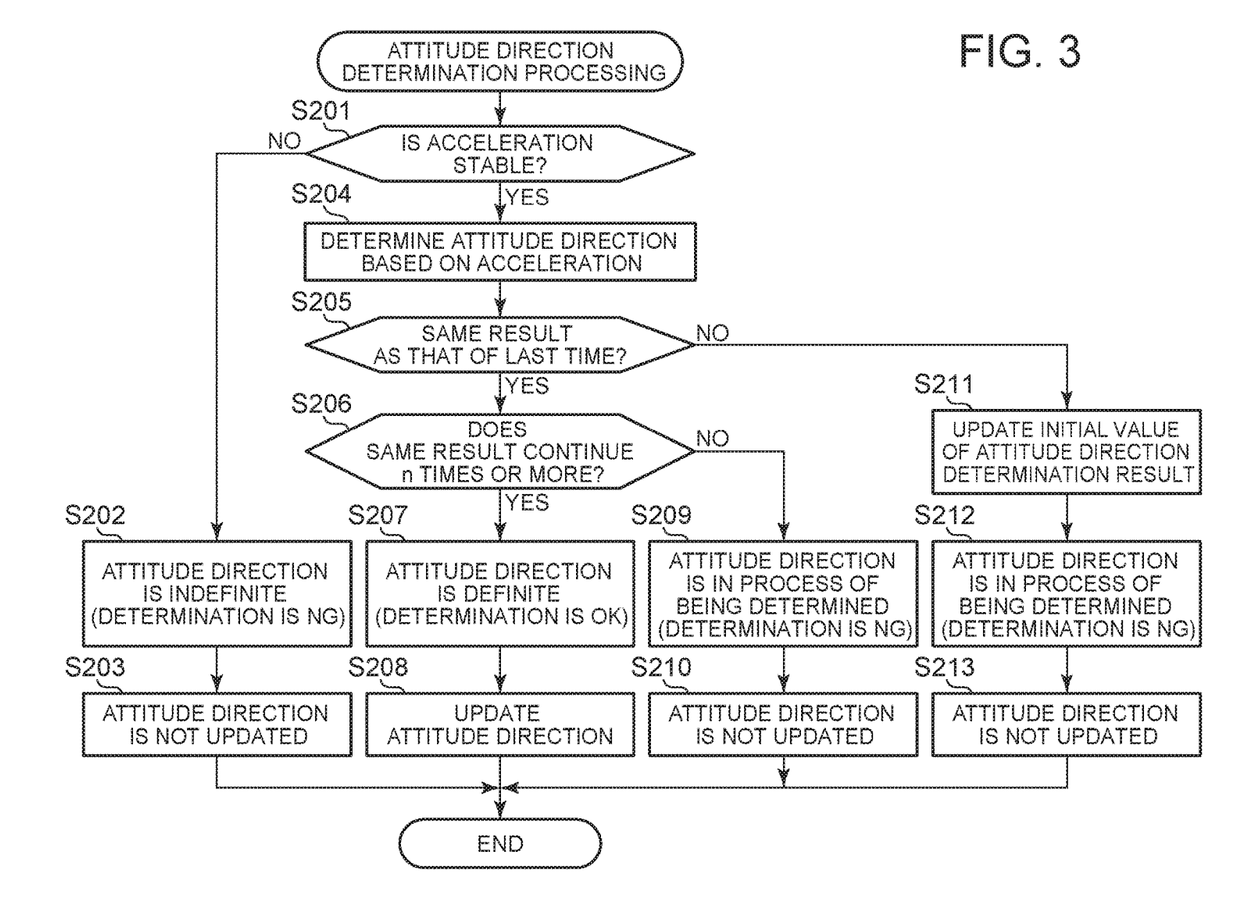
FIG. 3 is a flowchart illustrating the operation of attitude direction determination processing in the imaging apparatus according to the embodiment.

Next, the attitude determination unit 126 performs the attitude direction determination processing (step S102). FIG. 3 is a flowchart illustrating the operation of the attitude direction determination processing in the imaging apparatus 100.

The attitude determination unit 126 determines whether acceleration sequentially input from the acceleration sensor 110 is stable (step S201).

Figure 4:
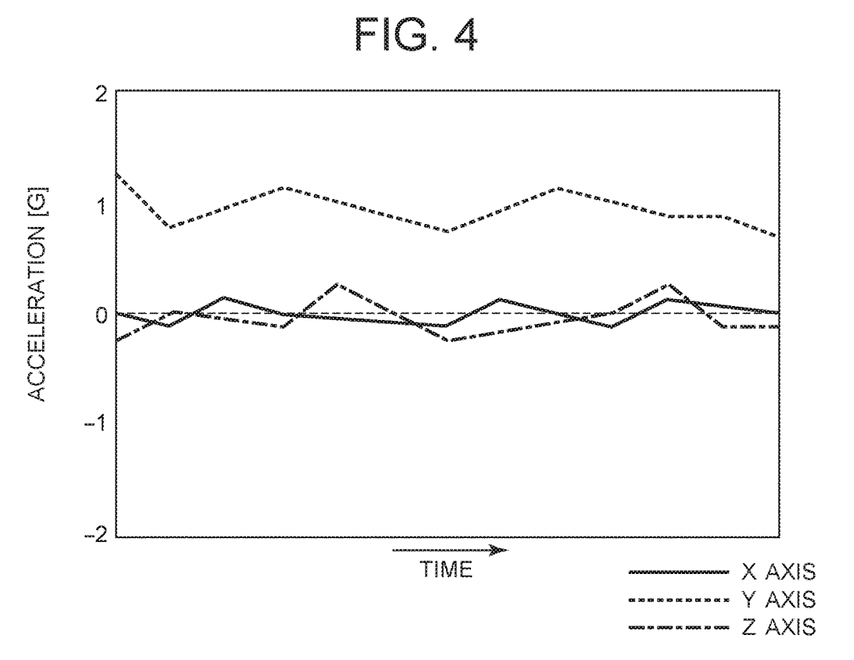
FIG. 4 is a graph illustrating an example of acceleration transition in the imaging apparatus according to the embodiment.
Figure 5:
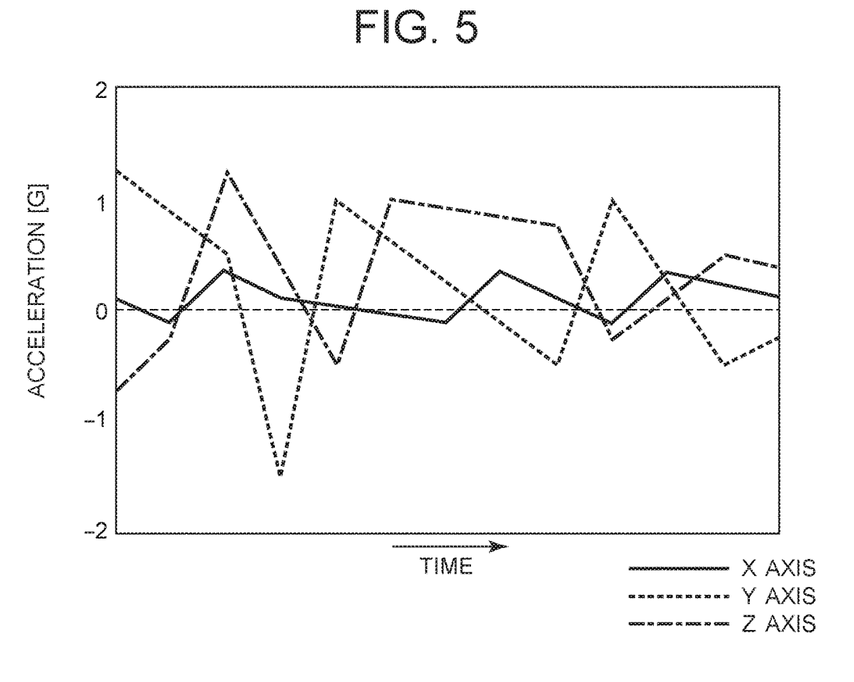
FIG. 5 is a graph illustrating another example of acceleration transition in the imaging apparatus according to the embodiment.

FIG. 4 and FIG. 5 are graphs illustrating examples of acceleration transition in the imaging apparatus 100. As mentioned above, the acceleration sensor 110 detects acceleration in each of the X-axis, Y-axis, and Z-axis directions in the three-dimensional space. In FIG. 4, changes in acceleration are small near 0[G] in the X-axis direction and the Z-axis direction, and changes in acceleration are small near 1[G] in the Y-axis direction, thus being stable. The reason why the acceleration in the Y-axis direction becomes near 1[G] is that gravitational acceleration acts in the Y-axis direction. In FIG. 5, on the other hand, acceleration changes greatly in all of the X-axis, Y-axis, and Z-axis directions and thus being not stable, and the direction of the gravitational acceleration is beyond recognition. In step S201, when a change in acceleration for a predetermined time (e.g., 100 [ms]) falls within a predetermined range, the attitude determination unit 126 determines that the acceleration is stable, while when the change exceeds the predetermined range, the attitude determination unit 126 determines that the acceleration is not stable.

When the acceleration is not stable (NO in step S201), the attitude determination unit 126 determines that the attitude direction is indefinite (determination is NG) (step S202), and does not update the attitude direction determination result stored in the non-volatile memory inside the memory 104 (step S203).

On the other hand, when the acceleration is stable (YES in step S201), the attitude determination unit 126 then determines the attitude direction at imaging timing of the imaging apparatus 100, i.e., the direction at imaging timing in which the lens system 111 faces, based on the acceleration (step S204).

Specifically, the attitude determination unit 126 determines the direction of gravitational acceleration based on a change in acceleration from the acceleration sensor 110. Next, the attitude determination unit 126 determines the direction of the gravitational acceleration to be the vertical direction, and the direction orthogonal to the direction of the gravitational acceleration to be the horizontal direction. Further, the attitude determination unit 126 obtains the orientation of the lens system 111 in the vertical direction (Y-axis direction) based on the acceleration in the vertical direction, and the orientation of the lens system 111 in the horizontal direction (X-axis direction) based on the acceleration in the horizontal direction. In this case, the attitude determination unit 126 determines which of four directions (0° (erecting), 90° (rotating 90° to the right), 180° (rotating 180°), and 270° (rotating 90° to the left)) the direction in which the lens system 111 faces in each of the vertical direction and the horizontal direction is, respectively, to obtain the attitude direction at imaging timing.

Next, the attitude determination unit 126 determines whether the attitude direction determination result determined in step S204 is the same result as the last attitude direction (step S205). Specifically, the attitude determination unit 126 compares the initial value of the attitude direction determination result with the attitude direction determination result determined in step S204 to determine whether both are identical.

When the attitude direction determination result determined in step S204 is the same result as the last attitude direction (YES in step S205), the attitude determination unit 126 determines whether the same result continues n times (e.g., five times in a cycle of 20 [ms]) or more (step S206). For example, a counter that increments by one each time the attitude direction determination result determined in step S204 becomes the same result as the last attitude direction is provided in the memory 104. In step S205, the attitude determination unit 126 causes the counter to increment by one each time the attitude direction determination result determined in step S204 is determined to be the same result as the last attitude direction. When both are not the same result, the counter is reset. Further, in step S206, the attitude determination unit 126 determines whether the value of the counter is n or more.

When the same result continues n times or more (YES in step S206), the attitude determination unit 126 determines that the attitude direction is definite (determination is OK) (step S207) and updates the attitude direction determination result, stored in the non-volatile memory inside the memory 104, to the attitude direction determination result determined in step S204, i.e., the attitude direction determination result determined in step S204 is adopted as the result in this time (step S208).

On the other hand, when the same result does not continue n times or more (NO in step S206), the attitude determination unit 126 determines that the attitude direction is in the process of being determined (determination is NG) (step S209), and does not update the attitude direction determination result stored in the non-volatile memory inside the memory 104 (step S210).

Further, when the attitude direction determination result determined in step S204 is not the same result as the last attitude direction (NO in step S205), the attitude determination unit 126 updates the initial value of the attitude direction determination result to the attitude direction determination result determined in step S204 (step S211).

Next, the attitude determination unit 126 determines that the attitude direction is in the process of being determined (determination is NG) (step S212), and does not update the attitude direction determination result stored in the non-volatile memory inside the memory 104 (step S213).

Returning again to FIG. 2, after the attitude direction determination processing in step S102, the imaging control unit 122 in the control unit 102 determines whether the user operates the operation unit 106 to make an imaging request (step S103).

When no imaging request is made (NO in step S103), the attitude direction determination processing in step S102 is repeated. On the other hand, when the imaging request is made (YES in step S103), the image acquisition unit 124 acquires the attitude direction determination result stored in the non-volatile memory inside the memory 104 to determine the attitude of the imaging apparatus 100 so as to adopt this attitude direction (step S104). Further, the image acquisition unit 124 performs imaging processing using the acquired attitude direction determination result (step S105). Specifically, the image acquisition unit 124 stores, in the memory 104, the acquired attitude direction determination result in association with the frame. Upon playback of the frame, blur correction and the like are performed on the frame using the associated attitude direction determination result.

After that, the control unit 102 determines whether the user operates the operation unit 106 to make a request for power-off of the imaging apparatus 100 (step S106). When the power-off is requested, (YES in step S106), the imaging apparatus 100 is powered off (step S107) to end the sequence of operations. On the other hand, when the power-off is not requested (NO in step S106), the attitude direction determination processing in step S102 is repeated.

As described above, in the imaging apparatus 100 according to the embodiment, when acceleration acting on the imaging apparatus 100 is stable and an attitude direction determination result based on the acceleration continue as the same result, the attitude direction determination result is updated to the latest one and used for blur correction and the like of the frame upon playback. On the other hand, when the acceleration acting on the imaging apparatus 100 is not stable, or when the attitude direction determination result based on the acceleration does not continue as the same result, the attitude direction determination result is not updated and the past attitude direction determination result is held and used for blur correction and the like upon playback of the frame.

Thus, even if imaging is performed cyclically while the attitude of the imaging apparatus 100 is not stable, blur correction and the like can be performed on the frame upon playback by using the past attitude direction determination result.

Second Embodiment

In the above first embodiment, the attitude direction determination result is stored in the memory 104 at the time of imaging in association with the frame, but an attitude direction determination result may be obtained at the time of playback.

Figure 6:
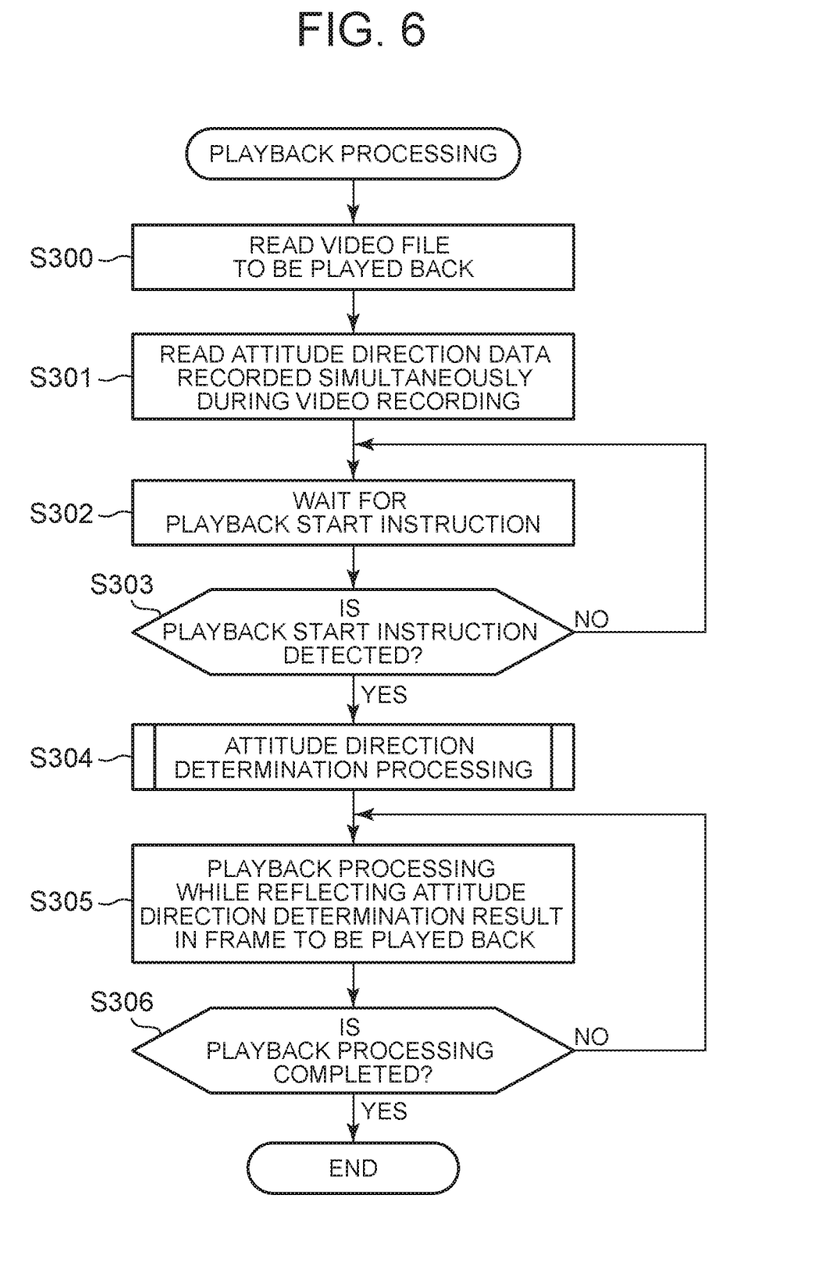
FIG. 6 is a flowchart illustrating the operation of playback processing in an imaging apparatus according to a second embodiment of the present invention.

FIG. 6 is a flowchart illustrating the operation of playback processing in this case. It is assumed that the imaging apparatus 100 of the above first embodiment performs the playback processing, and the circuit units functioning in this embodiment are the control unit 102, the memory 104, the operation unit 106, the display unit 120, the image acquisition unit 124, and the attitude determination unit 126.

It is also assumed that recorded still image files and video files are recorded in the non-volatile memory of the memory 104 in addition to various pieces of information (a program and the like) and attitude direction determination results used for control and the like in the imaging apparatus 100, and attitude directions at imaging time of the imaging apparatus 100 before the application of attitude direction determination processing, which are measured by the acceleration sensor 110 during recording are recorded with the elapsed time of recording.

When the imaging apparatus 100 is powered on and the operation unit 106 detects a predetermined operation, the control unit 102 shifts to a playback mode to read a video file to be played back, which is recorded in the memory 104 (step S300). Then, the control unit 102 reads attitude direction data recorded as metadata of this video file (step S301).

Then, the control unit 102 waits until a playback start instruction from the operation unit 106 is detected (step S302). When the playback start instruction is not detected (NO in step S303), the control unit 102 continues to wait in step S302, while when the playback start instruction is detected, attitude direction determination processing is performed at this time (step S304).

This attitude direction determination processing is performed in a way similar to step S102 and FIG. 3 of the first embodiment mentioned above. A different point is that the attitude determination unit 126 in the above first embodiment determines whether acceleration sequentially input from the acceleration sensor 110 is stable, whereas the attitude determination unit 126 in the second embodiment determines whether the imaging apparatus 100 recorded the video during video recording in a stable state.

Although the flowchart of FIG. 3 is also applied in the second embodiment, it is assumed that the attitude direction processing is performed in the process of playback processing by using acceleration information, composed of X-axis, Y-axis, and Z-axis accelerations sequentially input from the acceleration sensor 110 and recorded together with the video, in the determination processing in this flowchart.

Then, when the attitude direction determination processing in step 304 is completed, video playback processing is performed while reflecting the determination result in the frame to be played back (step S305). After that, the control unit 102 determines whether the playback processing is completed (step S306). When the completion of the playback processing is detected (YES in step S306), the processing is ended. On the other hand, when the completion of the playback processing is not detected (NO in step S306), the playback processing in step S305 is continued.

While the preferred embodiments of the present invention are described above, the present invention is not limited to the specific embodiments, and inventions and equivalents thereto described in the appended claims will be included in the present invention.

What is claimed is:

1. A data processing apparatus comprising:
a processor which
acquires, continuously with time, pieces of information related to an attitude of a data acquisition apparatus at the time of acquiring data acquired continuously with time, the data including image data, and
depending on a content of the information related to the acquired attitude, selects whether the information related to this time attitude is held in a storage unit and the information related to the attitude is applied, or information related to an attitude acquired at a time other than the time of acquiring the data and held in the storage unit is applied as the information related to this time attitude
wherein depending on whether a change in the pieces of information related to the attitude meets a predetermined condition, the processor further selects whether the pieces of information related to this time attitude are stored in the storage unit and the information related to the attitude is applied, or information related to an attitude acquired at a time other than the time of acquiring the data and held in the storage unit is applied as the information related to this time attitude.

2. The data processing apparatus according to claim 1, wherein the predetermined condition is that a degree of change in the pieces of information related to the attitude falls within a predetermined range.

3. The data processing apparatus according to claim 1, wherein the information related to the attitude stored in the storage unit is information related to the attitude when the data acquisition apparatus is stable.

4. The data processing apparatus according to claim 1, further comprising:
an acquisition unit that acquires the plural pieces of data; and
a detection unit that detects pieces of information related to the attitude of the data acquisition apparatus,
wherein the processor acquires the pieces of information related to the attitude of the data acquisition apparatus detected by the detection unit when the acquisition unit acquires the plural pieces of data.

5. The data processing apparatus according to claim 4, wherein
the acquisition unit includes an imaging unit, and
the image data is imaged by the imaging unit.

6. The data processing apparatus according to claim 5, wherein the imaging unit performs imaging in predetermined cycles.

7. The data processing apparatus according to claim 6, wherein the processor holds, in the storage unit, the information on the attitude in association with each of images captured by the imaging unit in the predetermined cycles.

8. A data processing method comprising:
an acquiring step of acquiring, continuously with time, pieces of information related to an attitude of a data acquisition apparatus at the time of acquiring data acquired continuously with time, the data including image data, and
a selecting step of, depending on a content of the information related to the acquired attitude, selecting whether the information related to this time attitude is held in a storage unit and the information related to the attitude is applied, or information related to an attitude acquired at a time other than the time of acquiring the data and held in the storage unit is applied as the information related to this time attitude
wherein in the selecting step, depending on whether a change in the pieces of information related to the attitude meets a predetermined condition, selecting whether the pieces of information related to this time attitude are stored in the storage unit and the information related to the attitude is applied, or information related to an attitude acquired at a time other than the time of acquiring the data and held in the storage unit is applied as the information related to this time attitude.

9. The data processing method according to claim 8, wherein the predetermined condition is that a degree of change in the pieces of information related to the attitude falls within a predetermined range.

10. The data processing method according to claim 8, wherein the information related to the attitude stored in the storage unit is information related to the attitude when the data acquisition apparatus is stable.

11. The data processing method according to claim 8, wherein
in the acquiring step, an acquisition unit acquires the plural pieces of data; and
a detection unit detects pieces of information related to the attitude of the data acquisition apparatus,
wherein the pieces of information related to the attitude of the data acquisition apparatus detected by the detection unit are acquired when the acquisition unit acquires the plural pieces of data.

12. A non-transitory computer-readable recording medium recording a program that causes a computer to function to:
acquire, continuously with time, pieces of information related to an attitude of a data acquisition apparatus at the time of acquiring data acquired continuously with time, the data including image data, and
depending on a content of the information related to the acquired attitude, select whether the information related to this time attitude is held in a storage unit and the information related to the attitude is applied, or information related to an attitude acquired at a time other than the time of acquiring the data and held in the storage unit is applied as the information related to this time attitude wherein depending on whether a change in the pieces of information related to the attitude meets a predetermined condition, the computer is further caused to function to select whether the pieces of information related to this time attitude are stored in the storage unit and the information related to the attitude is applied, or information related to an attitude acquired at a time other than the time of acquiring the data and held in the storage unit is applied as the information related to this time attitude.

13. The non-transitory recording medium according to claim 12, wherein the predetermined condition is that a degree of change in the pieces of information related to the attitude falls within a predetermined range.

14. The non-transitory recording medium according to claim 12, wherein the information related to the attitude stored in the storage unit is information related to the attitude when the data acquisition apparatus is stable.

15. The non-transitory recording medium according to claim 12, further causing the computer to function as an acquisition unit that acquires the plural pieces of data; and a detection unit that detects pieces of information related to the attitude of the data acquisition apparatus, wherein the processor acquires the pieces of information related to the attitude of the data acquisition apparatus detected by the detection unit when the acquisition unit acquires the plural pieces of data.

* * * * *